US006019490A

United States Patent [19]

Kibayashi

[11] Patent Number: 6,019,490

[45] Date of Patent: Feb. 1, 2000

[54] HEAD LAMP AIMING APPARATUS WITH L-SHAPED MOUNTING BRACKET AND POLYGON-SHAPED TAPPING HOLE

[75] Inventor: Michinobu Kibayashi, Shizuoka, Japan

[73] Assignee: Koito Manufacturing Co., Ltd., Tokyo, Japan

[21] Appl. No.: 08/923,917

[22] Filed: Sep. 5, 1997

[30] Foreign Application Priority Data

Sep. 6, 1996 [JP] Japan .................................... 8-255277

[51] Int. Cl.[7] ........................................ B60Q 1/06

[52] U.S. Cl. .......................... 362/487; 362/523; 362/528; 362/529; 362/421; 362/418; 362/419

[58] Field of Search .................................... 362/523, 528, 362/529, 421, 418, 419

[56] References Cited

U.S. PATENT DOCUMENTS 4,502,486 3/1985 Makita .................................... 362/515
4,503,486 3/1985 Makita .................................... 362/515
5,331,519 7/1994 Fujino .................................... 362/530
5,337,223 8/1994 Fujino .................................... 362/530
5,508,896 4/1996 Suehiro et al. ......................... 362/460
5,541,815 7/1996 Nakamura .............................. 362/460

*Primary Examiner*—Sandra O'Shea
*Assistant Examiner*—Ronald E. Delgizzi
*Attorney, Agent, or Firm*—Sughrue, Mion, Zinn, Macpeak & Seas, PLLC

[57] ABSTRACT

An inverted L-shaped fixed-side bracket 13 for fastening a lamp body 2 to a vehicle body 10. A vehicle-body fitting hole 13*c* is vertically bored through a tongue edge portion 13*b* projecting rearwardly from the upper end portion of the fixed-side bracket, and a cylindrical body 19 having a tapping hole 18 is projected rearwardly from a main portion 13*a*. The tapping hole 18 has a polygonal shape and receives an aiming-adjusting screw 15.

19 Claims, 7 Drawing Sheets

HEAD LAMP AIMING APPARATUS WITH L-SHAPED MOUNTING BRACKET AND POLYGON-SHAPED TAPPING HOLE

BACKGROUND OF THE INVENTION

1. Field of the Invention

The present invention relates to a head lamp aiming apparatus for fastening a head lamp to a vehicle body and variably adjusting-the optical axis of the head lamp with respect to the vehicle body, and more particularly to a head lamp aiming apparatus adapted for improving not only the workability of mounting a head lamp on a vehicle body but also the strength of an aiming-adjusting device.

2. Background Art

As shown in FIGS. 11–12, a typical head lamp 50 is constructed so that a lens 53 is fitted into the front opening portion of a lamp body 52 with a concave reflector 51 formed on its rear inner surface in order to form a lamp chamber 54. A bulb 56 is a light source which is fitted into a socket 55 mounted in the rear portion of the lamp body 52 and is supported substantially in the position of a focal point F on the optical axis L of the reflector 51 in the lamp chamber 54. The head lamp 50 is fastened, via an aiming apparatus, to the vehicle body.

The aforesaid aiming apparatus is equipped with a fixed-side bracket 57 having a boss 62 for receiving an aiming-adjusting screw (not shown) for laterally adjusting the optical axis L of the head lamp 50. A fulcrum 58, for pivotally supporting the head lamp 50 on the other side of the lamp body 52, and a fixed-side bracket 60, with a tapping hole 59 for use in screwing an aiming-adjusting screw (not shown), are for vertically adjusting the optical axis L of the head lamp 50. The fixed-side bracket 60 is situated beneath the fulcrum 58.

The bracket 57 has a fitting face 57*a* and is disposed between the lamp body 52 and a mounting portion of the vehicle body. The bracket 57 is fastened to the vehicle body using at least two fitting holes 61, 61 bored in the fitting face. When the aiming-adjusting screws are turned during the aiming operation, a rotational load is applied to the portion where these fitting holes 61, 61 have been formed. The rotational load not only hastens the deterioration of that portion of the bracket 57 and causes damage thereto, but also lowers the stability of the aiming-adjusting mechanism. Further, a great deal of rotational force is required when the aiming-adjusting screw is first threaded into a tapping hole 63 bored in the boss 62, because the tapping hole 63 is cylindrical. The large rotational force required for tapping the tapping hole 63 may cause damage to the fitting holes 61, 61 and also deteriorate the workability of mounting the head lamp.

SUMMARY OF THE INVENTION

An object of the present invention in view of the foregoing problems is to provide an aiming apparatus for a head lamp such that the lamp can be mounted on a vehicle body stably with one bolt without causing excessive force to be applied to a fixed-side bracket mount for the vehicle body during the aiming-turning operation of an aiming-adjusting screw, while at the same time allowing excellent tapping workability of the aiming-adjusting screw hole.

In order to accomplish the above object, the aiming apparatus of the present invention includes an inverted L-shaped fixed-side bracket for adjustably securing the head lamp to the vehicle, the fixed-side bracket including a main portion having an upper end, a tongue edge portion extending rearwardly from the upper end of the main portion, the tongue edge portion having a vehicle-body fitting hole, and a cylindrical body extending rearwardly from the main portion below the tongue edge portion, the cylindrical body having a tapping hole. The tapping hole preferably has a polygonal shape, and a lance may be formed on an outer peripheral portion of the cylindrical body.

The tapping hole in the cylindrical body is threaded or tapped by the aiming-adjusting screw received therein. The polygonal shape of the tapping hole allows the hole to be tapped by the aiming-adjusting screw with relatively little force. Moreover, the cylindrical body and the bracket may be formed by monolithic molding.

The lance formed on the outer peripheral portion of the cylindrical body prevents the cylindrical body from slipping off when the fixed side bracket is mounted on the vehicle body.

BRIEF DESCRIPTION OF THE DRAWING FIGURES

FIG. 13(*b*) is an elevational view of the cylindrical body portion of the bracket shown in FIG. 13(*a*).

DETAILED DESCRIPTION OF THE PREFERRED EMBODIMENTS

An aiming apparatus for a head lamp as the preferred embodiment of the present invention will subsequently be described with reference to the accompanying drawings.

Figure 6:
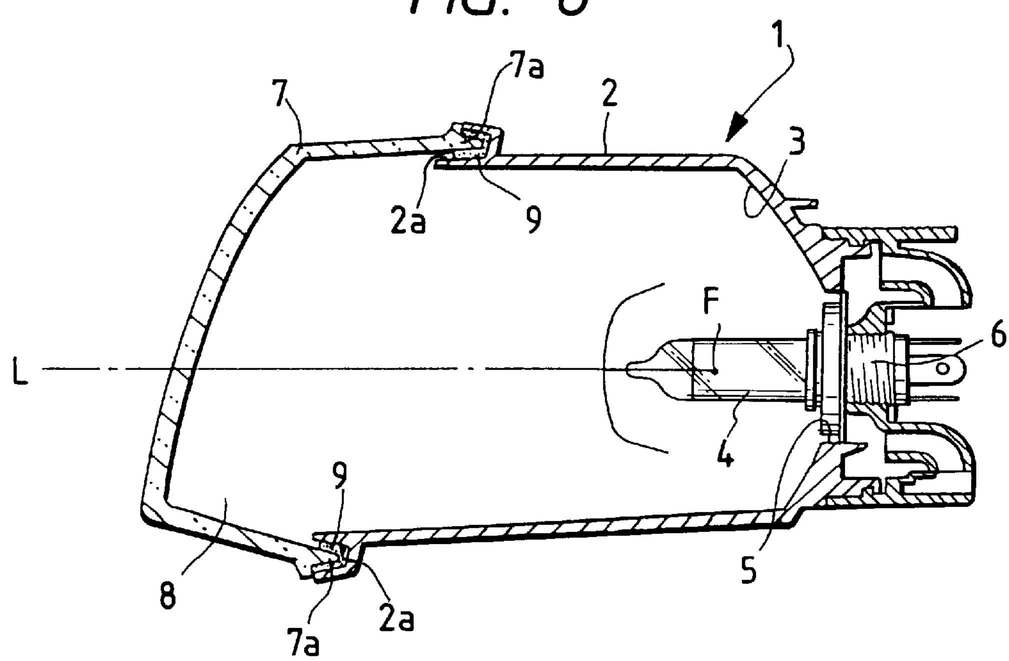
FIG. 6 is a sectional view taken on line 6—6 of FIG. 1.
Figure 7:
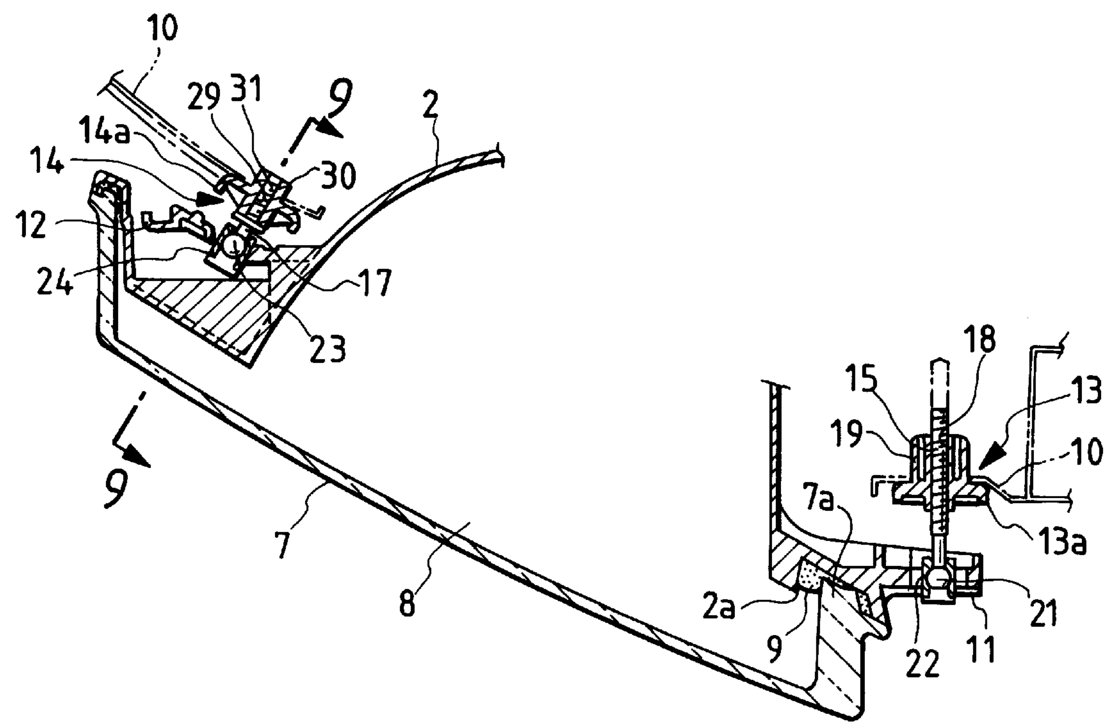
FIG. 7 is a sectional view taken on line 7—7 of FIG. 1.

In the drawings, reference numeral 1 denotes a head lamp constituting an aiming apparatus therefor according to the present invention; more specifically, a reflector 3 (FIG. 6) which is substantially elliptic is formed on the rear inner surface of a substantially rectangular lamp body 2 in a front view; and a bulb 4 as a light source is supported in the position of a focal point F on the optical axis L of the reflector 3. The light generated by the bulb 4 is emitted forward in the form of substantially parallel rays of light via the parabolic mirror surface of the reflector 3. The bulb 4 is fitted into a detachable socket 6 via a socket through-hole 5, so that the bulb 4 is made replaceable by removing the socket 6 from the reflector 3. Further, a substantially rectangular front lens 7, which is consistent in front shape with the opening portion of the lamp body 2, is fitted into the front opening portion thereof so as to form an airtight lamp chamber 8 inside. According to this embodiment of the invention, the front lens 7 is integrally bonded to the lamp body 2 by fitting a sealing leg portion 7*a* integral with the outer periphery of the front lens 7 into the sealing groove 2*a* formed in the outer peripheral edge portion of the front opening portion of the lamp body 2 by the use of an adhesive 9. Further, the front lens 7 is made of transparent plastics such as acrylic resin or the like and tilted forwardly and downwardly in such a way as to be in parallel to the shape of a lamp-body fitting hole (not shown) on the front side of a vehicle body 10 and slightly curved outward in the vertical direction, that is, it is slant-shaped. The front lens 7 is thus tilted forwardly and downwardly so that it may fit in well with the design shape of the vehicle body 10 (FIGS. 7 and 9), decrease air resistance and secure stability during the driving of the vehicle.

The head lamp 1 thus constructed is fastened to the vehicle body 10 via the aiming apparatus installed on the rear surface of the lamp body 2 in such a manner that its turning motion is adjustable.

The aiming apparatus affixed to the head lamp 1 is normally equipped with tilted-side brackets 11, 12 installed in the respective lateral end portions on the rear surface side of the lamp body 2, and fixed-side brackets 13, 14 fixedly installed on the corresponding side of the vehicle body 10. An aiming-adjusting screw 15 for laterally adjusting the optical axis L of the head lamp 1 with respect to the vehicle body 10 is disposed between the one corresponding tilted-side bracket 11 and the fixed-side bracket 13, whereas an aiming-adjusting screw 16 for vertically adjusting the optical axis L of the head lamp 1 with respect to the vehicle body 10 is disposed between the other tilted-side bracket 12 and the fixed-side bracket 14. Further, a support shaft 17 is installed between the other tilted-side bracket 12 and the fixed-side bracket 14 so as to pivotally support the head lamp 1 with respect to the vehicle body 10.

More specifically, according to this embodiment of the invention, the one tilted-side bracket 11 is formed by monolithic molding on the rear surface of the lamp body 2 and the aiming-adjusting screw 15 is screwed from the front side of the tilted-side bracket 11 into the fixed-side bracket 13 fastened to the vehicle body 10. Consequently, the head lamp 1 is moved back and forth by turning the aiming-adjusting. screw 15 from the front side of the head lamp 1 so as to laterally move and adjust the optical axis L of the head lamp 1. The fixed-side bracket 13 into which the lateral aiming-adjusting screw 15 has been screwed from the side of the lamp body 2 is an inverted L-shaped. A tongue edge portion 13*b* projecting rearwardly is formed at the upper end of a main portion 13*a*. A cylindrical body 19 with a tapping hole 18 bored therein for receiving the aiming-adjustment screw 15 projects from a rear surface of the main portion 13*a* in substantially the same direction as the tongue edge portion 13*b*. A vehicle-body fitting hole 13*c* for receiving a bolt or the like (not shown) for use in mounting the tongue edge portion 13*b* onto the vehicle body 10 is bored in the tongue edge portion 13*b*.

Figure 1:
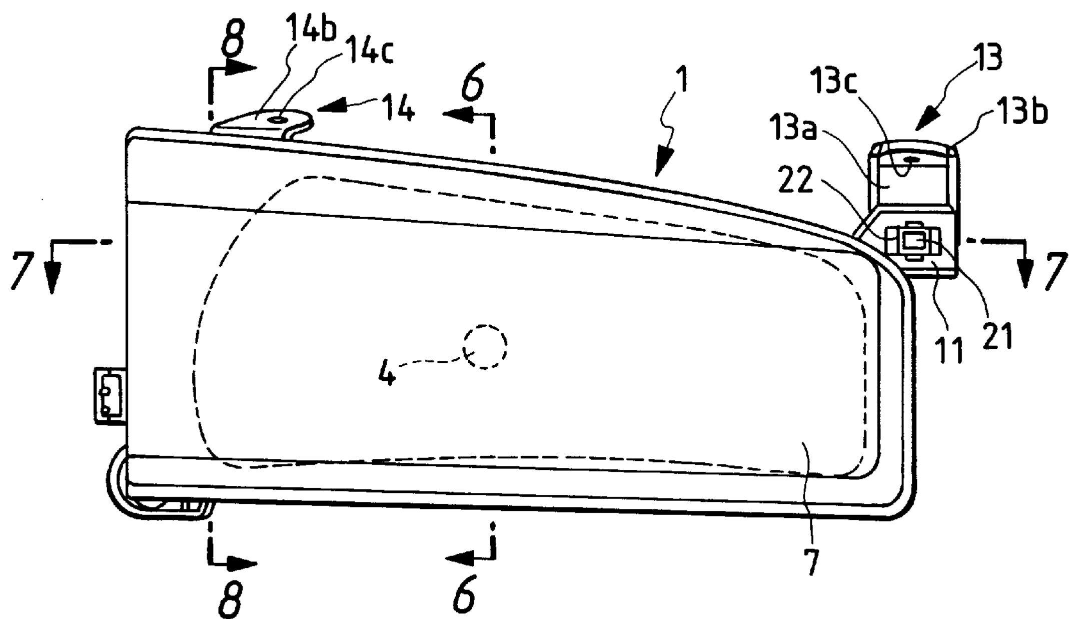
FIG. 1 is an elevational view of a head lamp according to the present invention.
Figure 2:
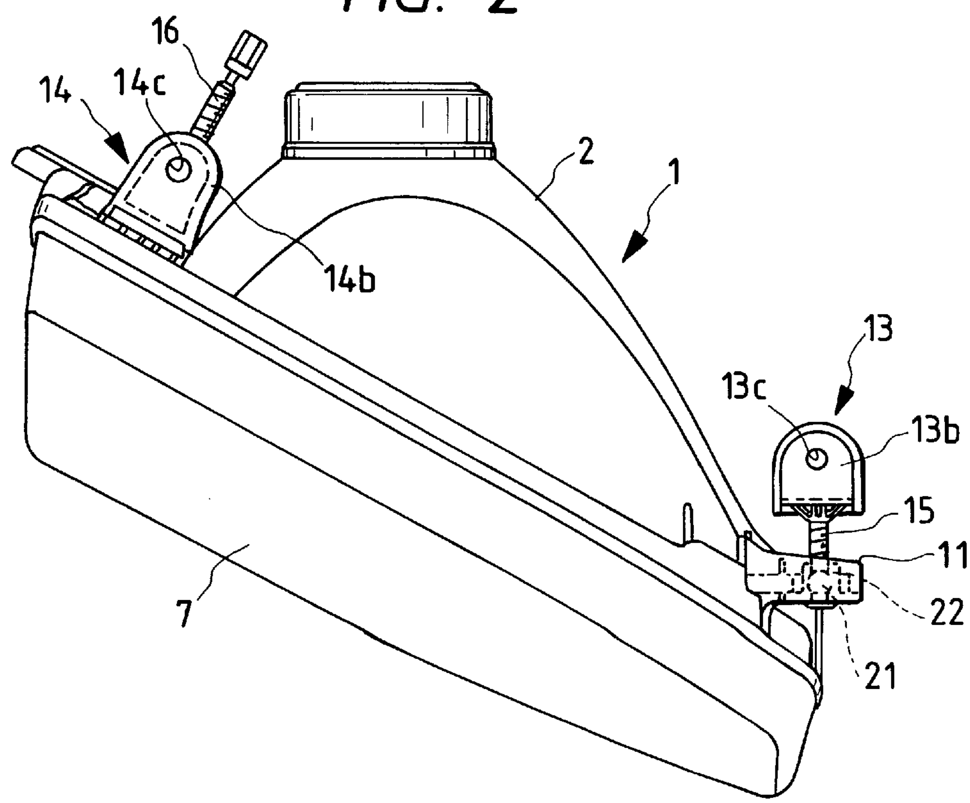
FIG. 2 is a plan view thereof.
Figure 3:
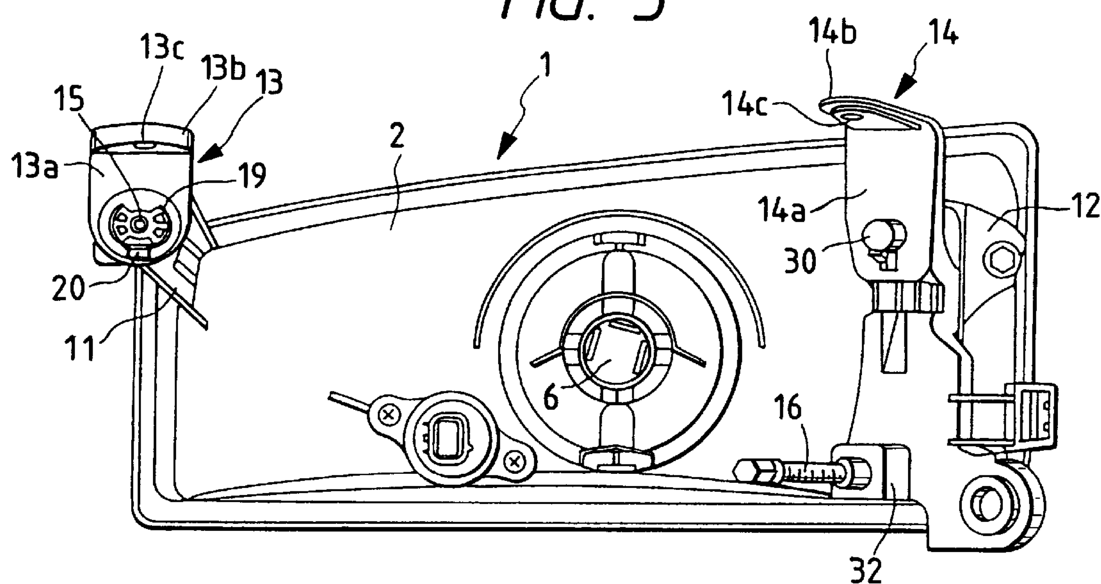
FIG. 3 is a rear elevation thereof.
Figure 4:
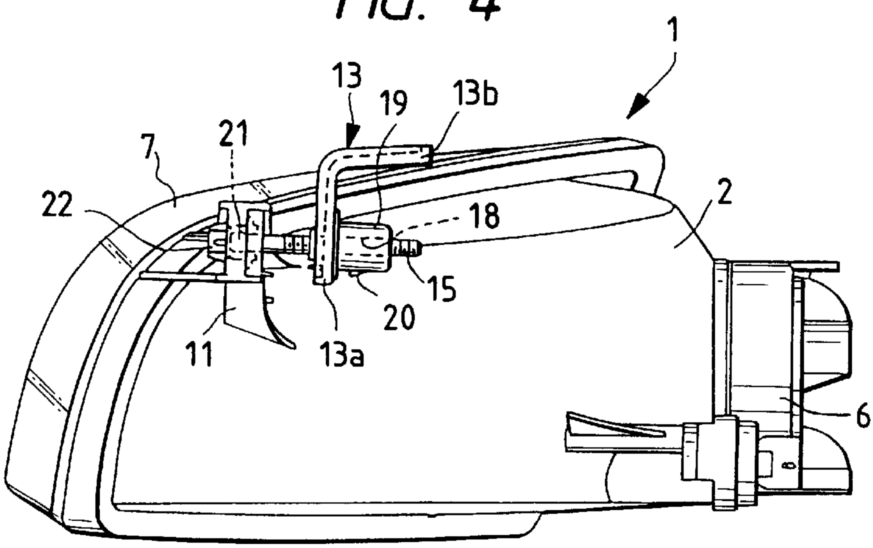
FIG. 4 is a right side view thereof.
Figure 5:
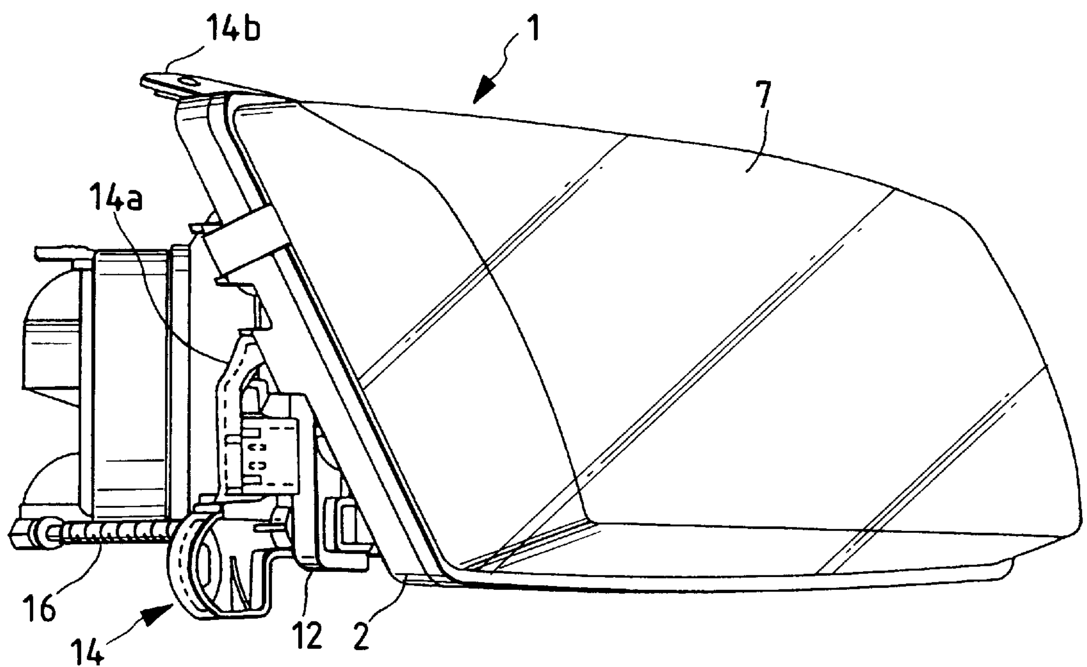
FIG. 5 is a left side view thereof.
Figure 10:
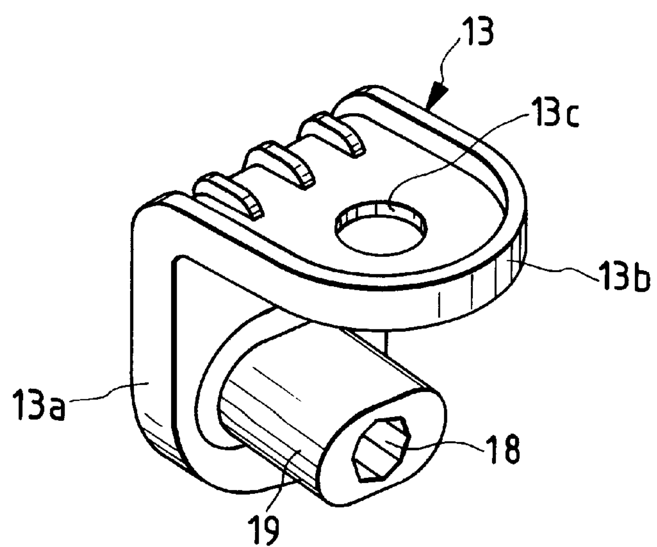
FIG. 10 is a perspective view showing the structure of a fixed-side bracket on one side.
Figure 11:
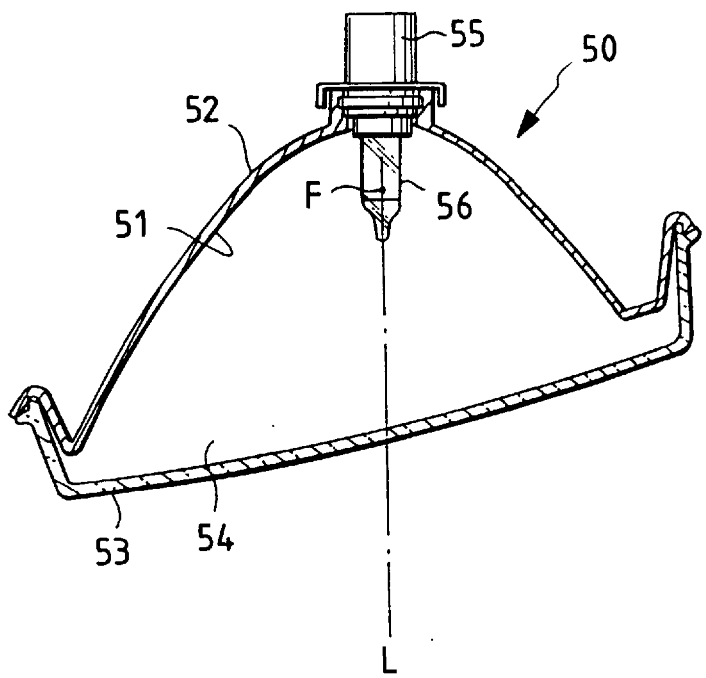
FIG. 11 is a sectional view of the principal part of the structure of a typical head lamp.
Figure 12:
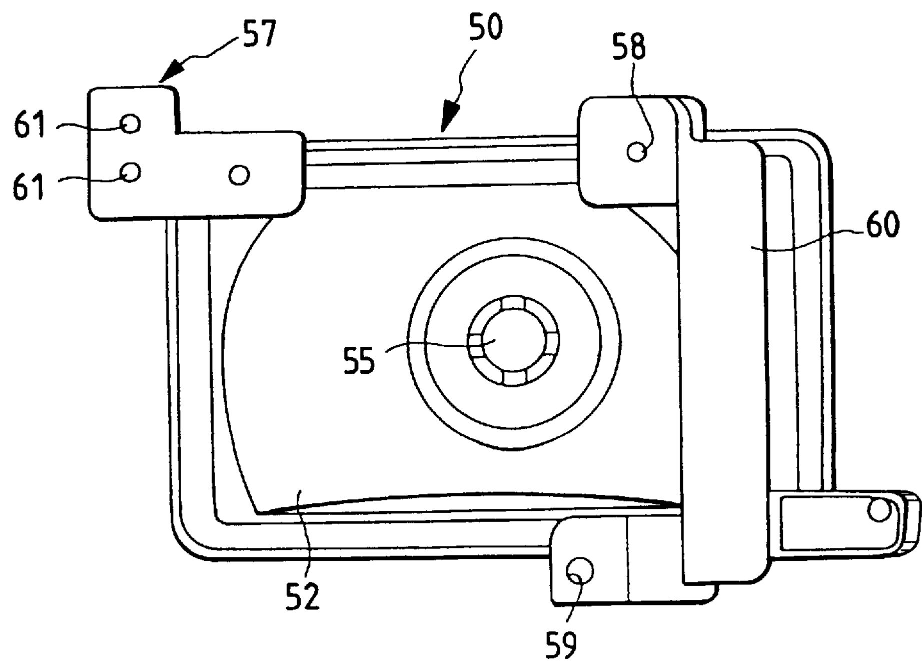
FIG. 12 is a rear elevation thereof.
Figure 13A:
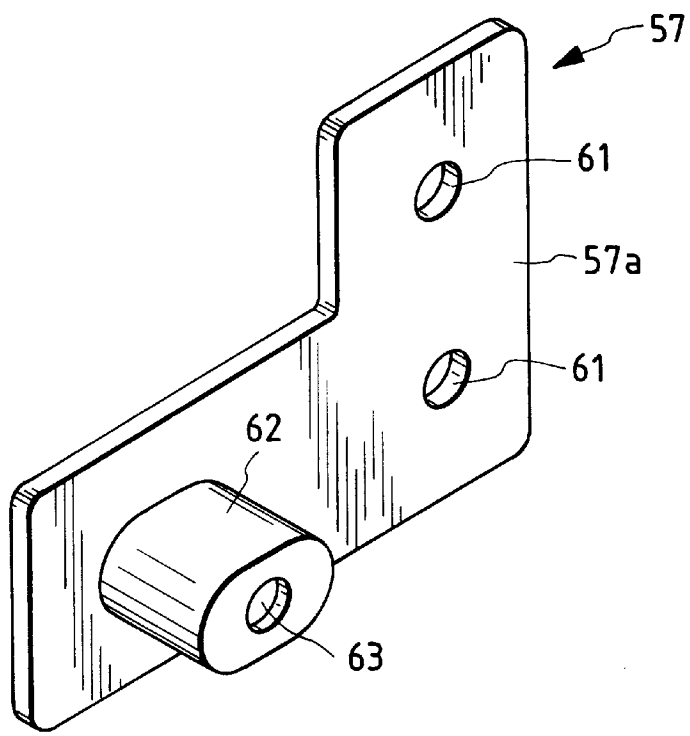
FIG. 13(*a*) is a perspective view of a typical bracket.
Figure 13B:
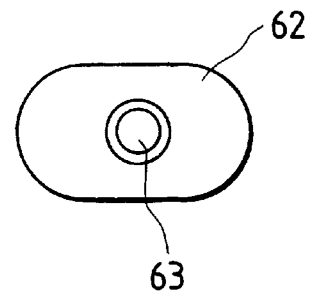

Threads are formed in the tapping hole 18 bored in the cylindrical body 19 by screwing the aiming-adjusting screw 15 into the hole, and the cylindrical body 19 itself is integrally formed with the fixed-side bracket 13. Further, the tapping hole 18 according to the present invention is polygonal in cross section, for example, hexagonal or octagonal (octagonal as shown in FIG. 10). A lance 20 (FIG. 3) is formed on the cylindrical body 19 at the bottom of the outer peripheral portion of the cylindrical body 19. The formation of a polygonal tapping hole 18 makes it possible to form a threaded hole in the cylindrical body 19 with a low rotational force, thus improving tapping workability. This is because a smaller part of the cylindrical surface of the tapping hole 18 contacts the screw 15, i.e., the frictional force required during tapping is reduced. Moreover, the lance 20 formed on the outer peripheral portion of the cylindrical body 19 engages with a retaining portion (not shown) formed on the side of the vehicle body 10 and serves to stop the cylindrical body 19 from slipping off when the fixed-side bracket 13 is mounted on the vehicle body 10. In addition, the entire tongue edge portion 13*b* contacts the vehicle body 10 to resist the rotational force exerted when tapping the hole 18 and during aiming adjustment, rather than concentrating this force on one or more bolts or pins. The mounting stability of the head lamp 1 is also prevented from being impaired due to vibration while driving the vehicle.

A pivot 21 is formed at the tip of the aiming-adjusting screw 15, and this pivot 21 is engaged with a pivot receptacle 22 formed in the tilted-side bracket 11 which is formed by monolithic molding on the side of lamp body 2. One side of the head lamp 1 is moved back and forth by turning the aiming-adjusting screw 15 from the side of the vehicle body 10, so that the optical axis L of the head lamp 1 with respect to the vehicle body 10 becomes laterally adjustable.

Figure 8:
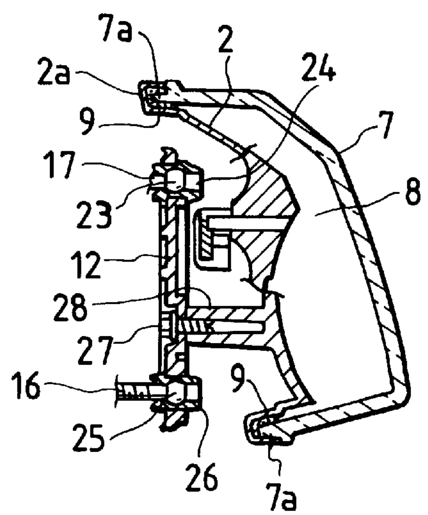
FIG. 8 is a sectional view taken on line 8—8 of FIG. 1.
Figure 9:
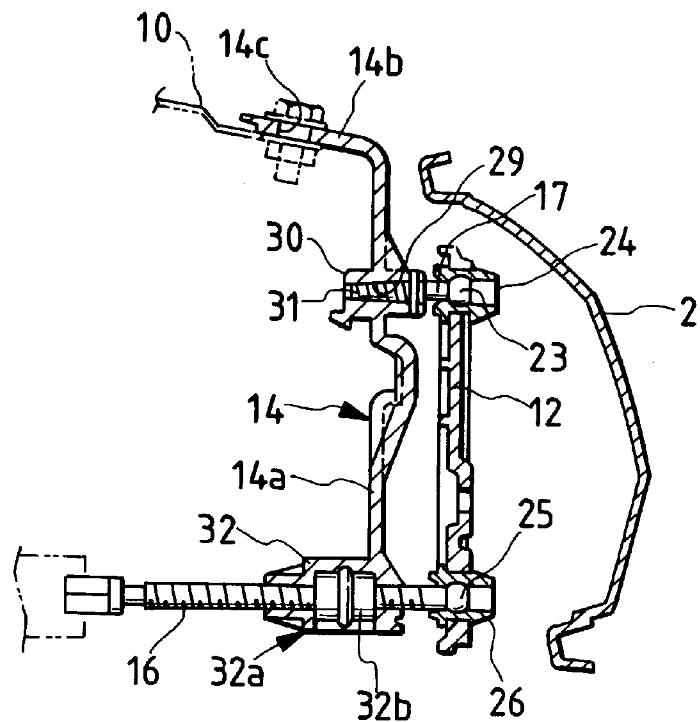
FIG. 9 is a sectional view taken on line 9—9 of FIG. 7.

According to this embodiment of the invention, the other tilted-side bracket 12 is installed separately from the lamp body 2 (see FIGS. 8–9). This tilted-side bracket 12 on the other side of the lamp body 2 is vertically oblong and pivotally supports a pivot 23 formed at the tip of the support shaft 17 using a pivot receptacle 24 as a rotational fulcrum, and further includes a pivot receptacle 26 for pivotally supporting a pivot 25 formed at the tip of the aiming-adjusting screw 16 for vertically adjusting the optical axis L of the head lamp 1 thereunder. In the intermediate portion, a tapping screw 27 (FIG. 8) is used to fasten the bracket 12 to a tapping boss 28 formed on the rear surface of the lamp body 2. Further, the other fixed-side bracket 14 disposed opposite to the tilted-side bracket 12 has an inverted L-shaped tongue edge portion 14*b* extending rearward on the upper end of a main portion 14*a*. A vehicle-body fitting hole 14*c* vertically passing through the tongue edge portion 14*b* is bored therein. A support shaft bearing 30 corresponding to the pivot receptacle 24 and having a tapping-hole 29 is formed in the main portion 14*a*. A tapping screw 31 connected to or integrally formed with the support shaft 17 is fixedly screwed into the support shaft bearing 30. Pivot 23 on the outer end of the support shaft 17 is fit into the pivot receptacle 24 of the tilted-side bracket 12.

Further, there is formed thereunder a cylindrical body 32 which corresponds to the pivot receptacle 26 installed on the side of the tilted-side bracket 12 and has a hollowed tapping hole (not shown) longitudinally passing therethrough. According to this embodiment of the invention, the cylindrical body 32 includes a cylinder receptacle 32*a* formed by cutting away the lower peripheral wall surface, and a body 32*b* formed by a separate member which is detachable from the cylinder receptacle 32*a*. The aiming-adjusting screw 16 is screwed into the tapping hole in the body 32*b*, and the pivot 25 formed at its tip can be fitted into the pivot receptacle 26 of the tilted-side bracket 12 or released therefrom. Moreover, the tapping hole in the cylindrical body 32*b* is polygonal (e.g., hexagonal or octagonal) like the tapping hole 18 in the cylindrical body 19, whereby the tapping workability of the aiming-adjusting screw 16 with respect to the cylindrical body 32*b* is enhanced.

In the aiming apparatus for a head lamp according to the present invention constructed as set forth above, the head lamp can be mounted on the vehicle body via the tongue edge portion 13*b* of the bracket with only one bolt or pin.

Further, the entire tongue edge portion can bear the load generated when the aiming-adjusting screw is turned. In addition, the tapping hole is polygonal. As a result of the above noted features, the aiming apparatus for the head lamp is stable during the aiming-turning operation, and excellent in the tapping workability of the aiming-adjusting screw.

What is claimed is:

1. An aiming apparatus for a head lamp of a vehicle, comprising:

an inverted L-shaped fixed-side bracket for adjustably securing the head lamp to the vehicle, wherein said fixed-side bracket comprises:

a main portion having an upper end;

a tongue edge portion extending rearwardly from said upper end of said main portion, said tongue edge portion having a vehicle-body fitting hole; and a cylindrical body extending rearwardly from said main portion below said tongue edge portion, said cylindrical body having a tapping hole.

2. An aiming apparatus as recited in claim 1, wherein said tapping hole has a polygonal shape.

3. An aiming apparatus as recited in claim 1, wherein said main portion, said tongue edge portion and said cylindrical body are a single piece.

4. An aiming apparatus as recited in claim 1, further comprising a lance formed on an outer peripheral portion of said cylindrical body.

5. An aiming apparatus as recited in claim 2, wherein said polygonal shape is an octagon.

6. An aiming apparatus as recited in claim 2, wherein said polygonal shape is a hexagon.

7. An aiming apparatus for a headlamp of a vehicle, comprising:

a lamp body;

a tilted-side bracket fixedly secured to said lamp body;

a fixed-side bracket fixedly secured to the vehicle, said fixed-side bracket having a tapping hole, said tapping hole having a polygonal shape; and an aiming-adjusting screw pivotally secured to said tilted-side bracket and threadably engaged in said tapping hole.

8. An aiming apparatus as recited in claim 7, wherein said fixed-side bracket has a vertically oriented main portion and a horizontally oriented tongue edge portion, and wherein said tapping hole is formed in a cylindrical body protruding from said main portion.

9. An aiming apparatus as recited in claim 8, wherein said tongue edge portion includes a vehicle-body fitting hole.

10. A bracket fixedly secured to a vehicle body for adjustably mounting a headlamp using an aiming adjustment screw, said bracket comprising:

a first portion extending in a direction substantially transverse to a longitudinal axis of the vehicle body;

a second portion extending rearwardly from said first portion and having a vehicle-body fitting hole for attaching the bracket to the vehicle body; and a boss extending rearwardly from said first portion, said boss having a tapping hole that is tapped by the aiming adjustment screw, the aiming adjustment screw being pivotally connected to the headlamp.

11. A bracket as recited in claim 10, wherein said tapping hole has a polygonal shape.

12. An aiming apparatus for a vehicular headlamp, comprising:

an inverted L-shape fixed side bracket which secures a lamp body to a vehicle body;

a cylindrical body formed integrally with said bracket;

a polygonal shaped tapping hole bored in said cylindrical body, said tapping hole being engageable with an aiming adjustment screw.

13. The aiming apparatus as recited in claim 12, further comprising a lance formed on an outer peripheral portion of said cylindrical body.

14. An aiming apparatus as recited in claim 1, wherein the longitudinal axis of said tapping hole is perpendicular to that of said vehicle-body fitting hole.

15. An aiming apparatus as recited in claim 1, wherein said main portion, said tongue edge portion, and said cylindrical body are monolithic.

16. An aiming apparatus as recited in claim 8, wherein said main portion, said tongue edge portion, and said cylindrical body are monolithic.

17. An aiming apparatus as recited in claim 10, wherein the longitudinal axis of said tapping hole is perpendicular to that of said vehicle-body fitting hole.

18. An aiming apparatus as recited in claim 10, wherein said first portion, said second portion, and said boss are monolithic.

19. An aiming apparatus as recited in claim 12, wherein said cylindrical body and said bracket are monolithic.

* * * * *